Oct. 12, 1954   T. R. THOMAS   2,691,428
LUBRICATION
Filed Jan. 11, 1949   7 Sheets-Sheet 1
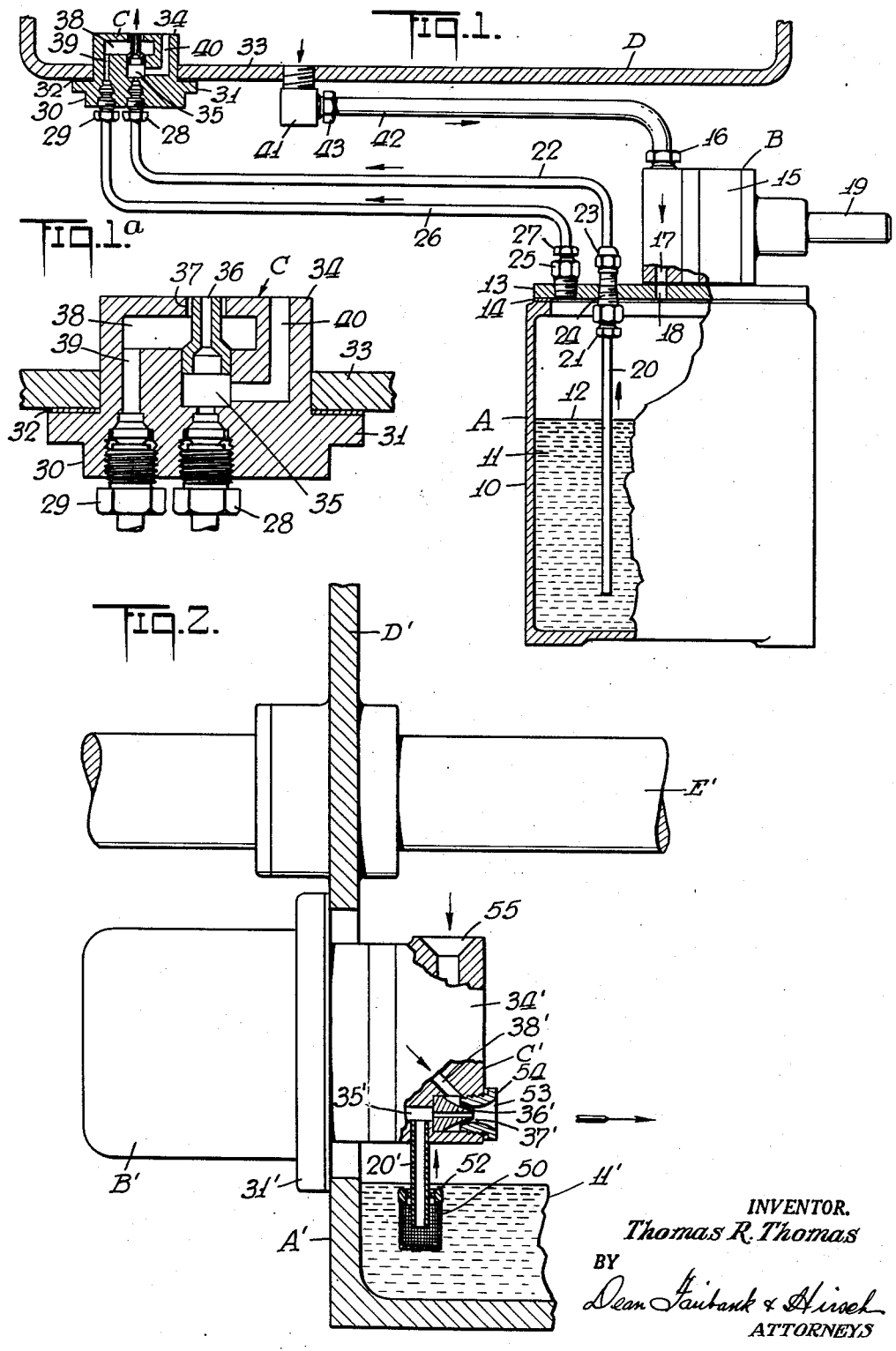
INVENTOR.
Thomas R. Thomas
BY
Dean Fairbank & Hirsch
ATTORNEYS Oct. 12, 1954
T. R. THOMAS
2,691,428
LUBRICATION
Filed Jan. 11, 1949
7 Sheets-Sheet 2
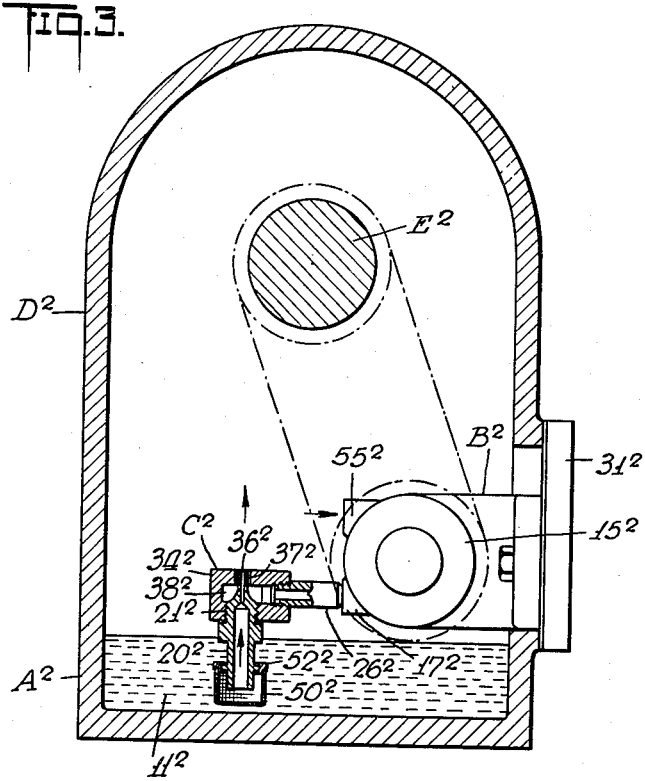
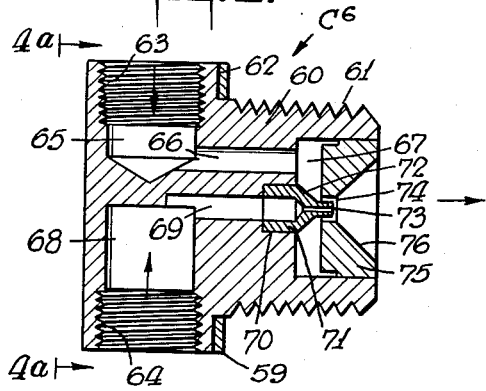
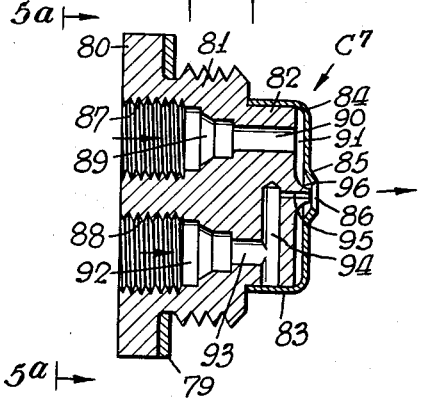
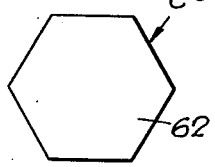
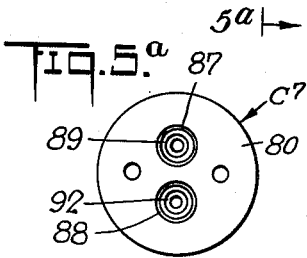
INVENTOR.
Thomas R. Thomas
BY
Dean Fairbank & Hirsch
ATTORNEYS Oct. 12, 1954
T. R. THOMAS
2,691,428
LUBRICATION
Filed Jan. 11, 1949
7 Sheets-Sheet 3
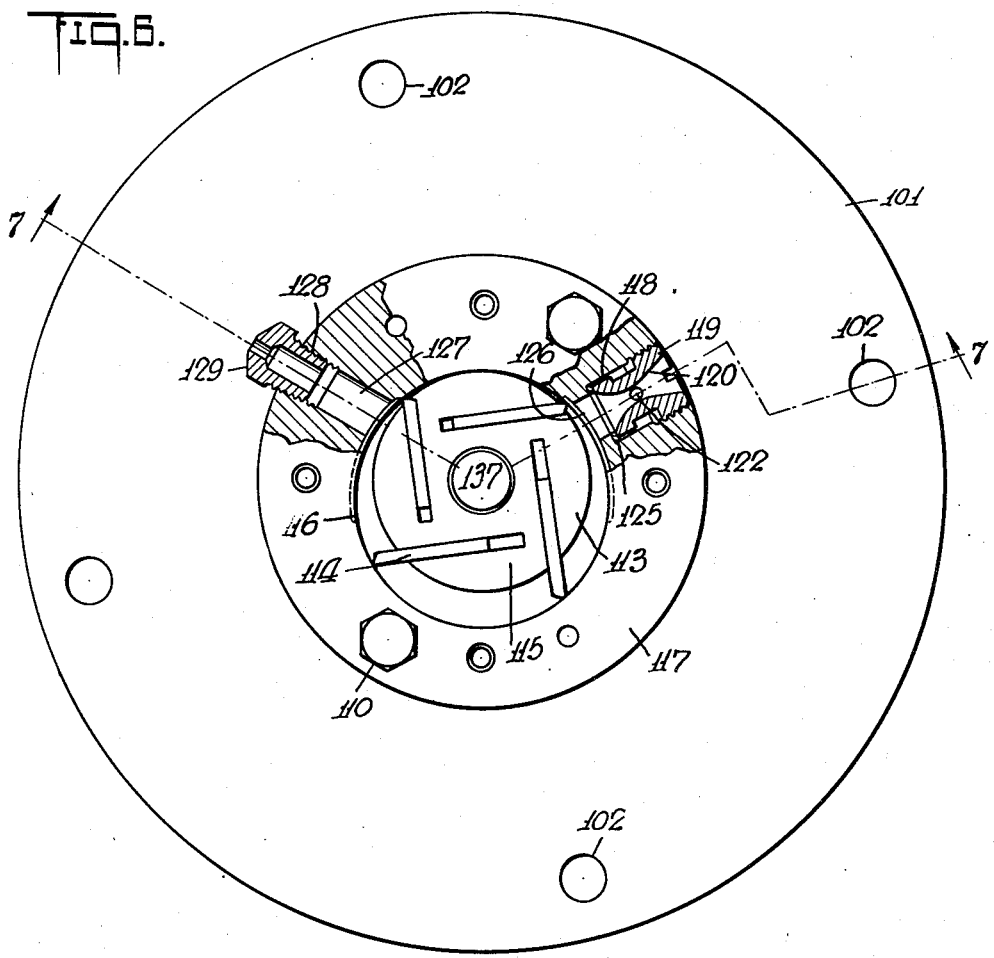
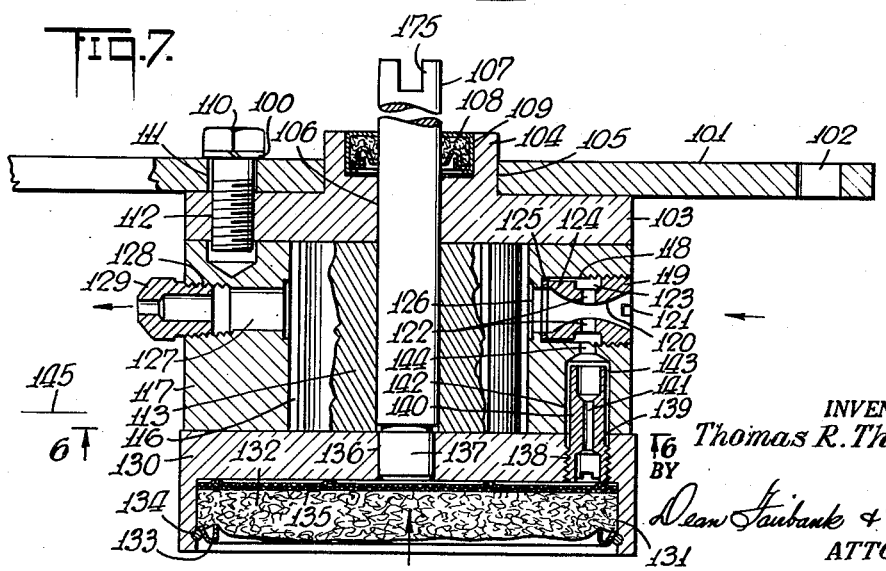
INVENTOR.
Thomas R. Thomas
BY
ATTORNEYS Oct. 12, 1954
T. R. THOMAS
2,691,428
LUBRICATION
Filed Jan. 11, 1949
7 Sheets-Sheet 4
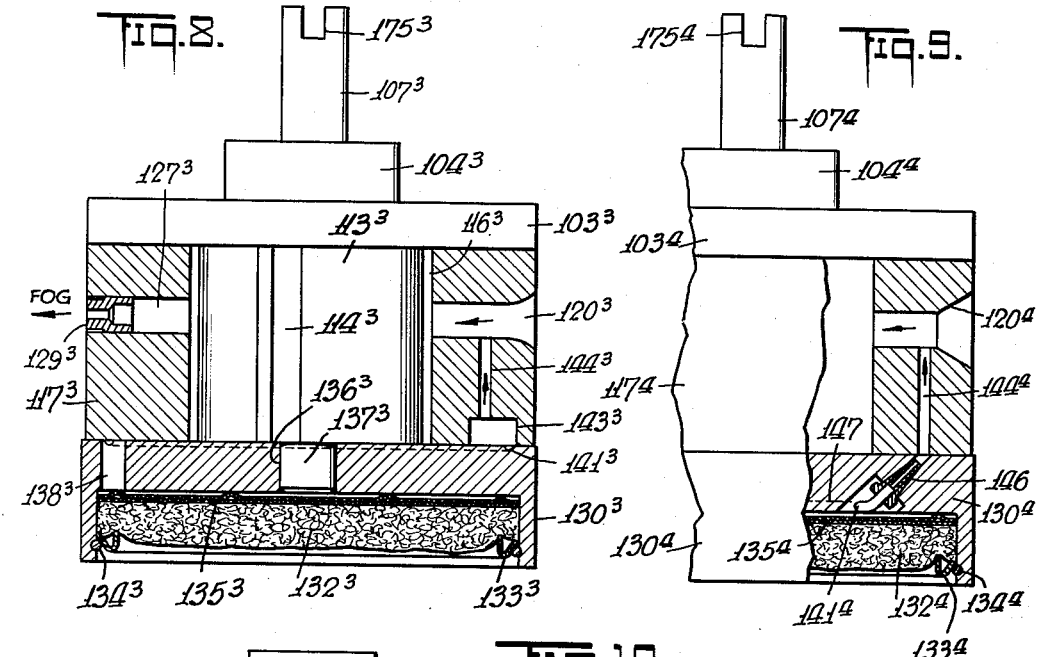
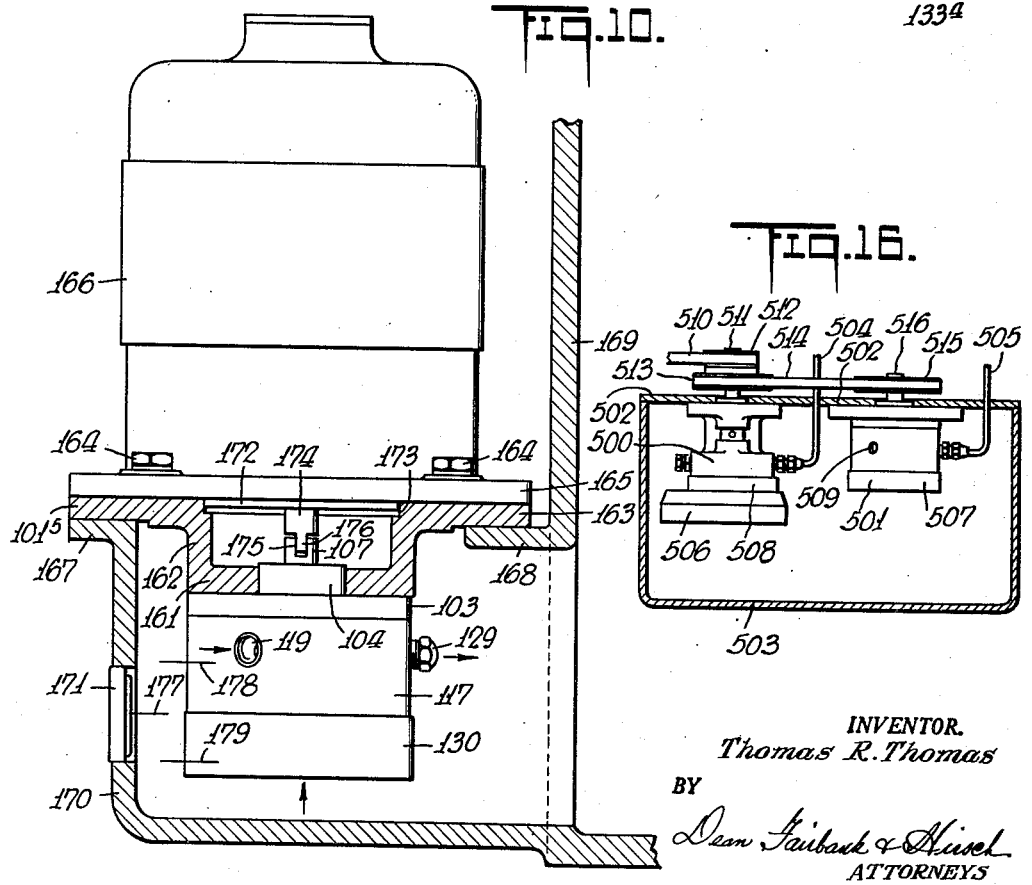
INVENTOR.
Thomas R. Thomas
BY
Dean Fairback & Hirsel
ATTORNEYS Oct. 12, 1954
T. R. THOMAS
2,691,428
LUBRICATION
Filed Jan. 11, 1949
7 Sheets-Sheet 5
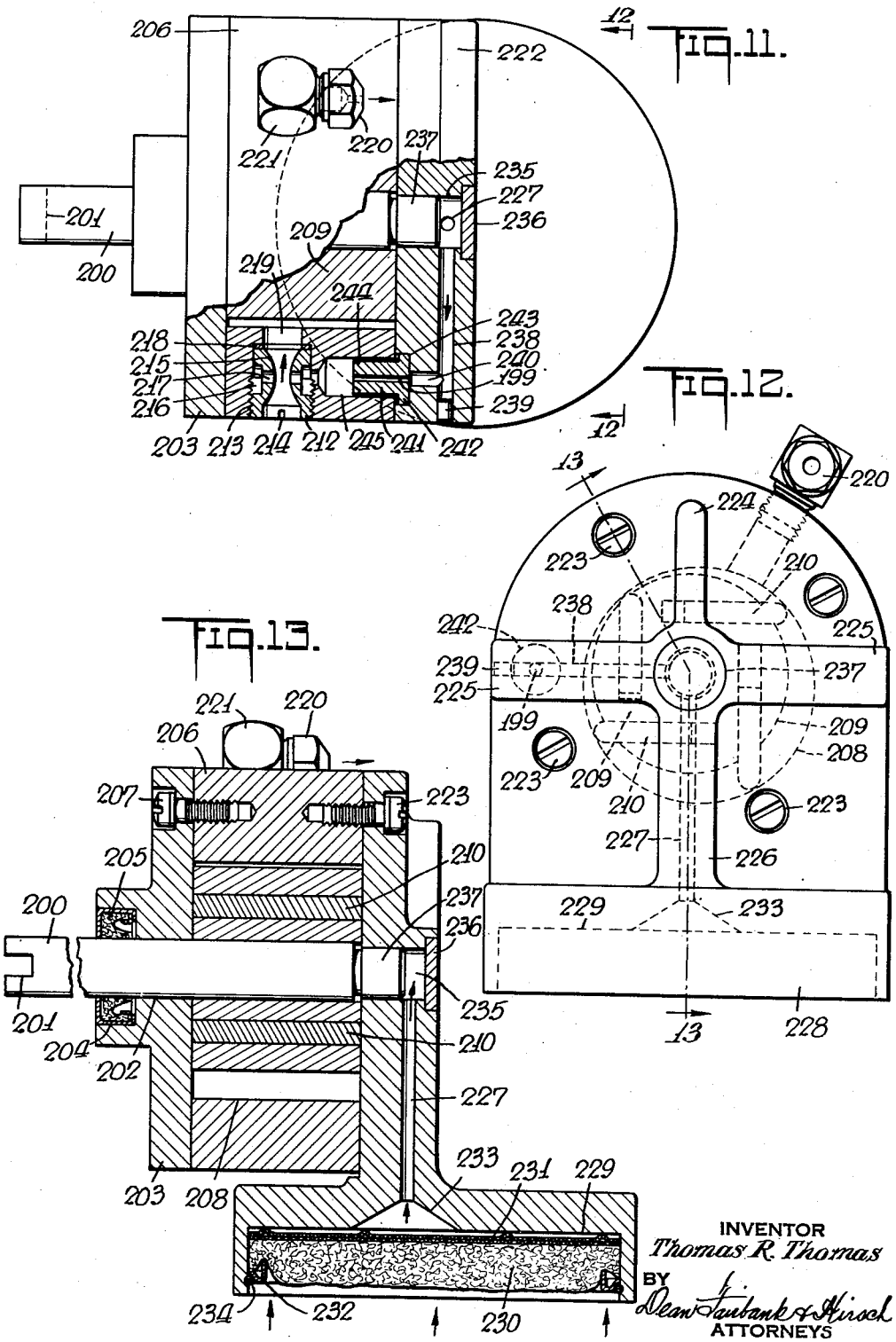
INVENTOR
Thomas R. Thomas
BY
Dean Fairbank & Hirsch
ATTORNEYS

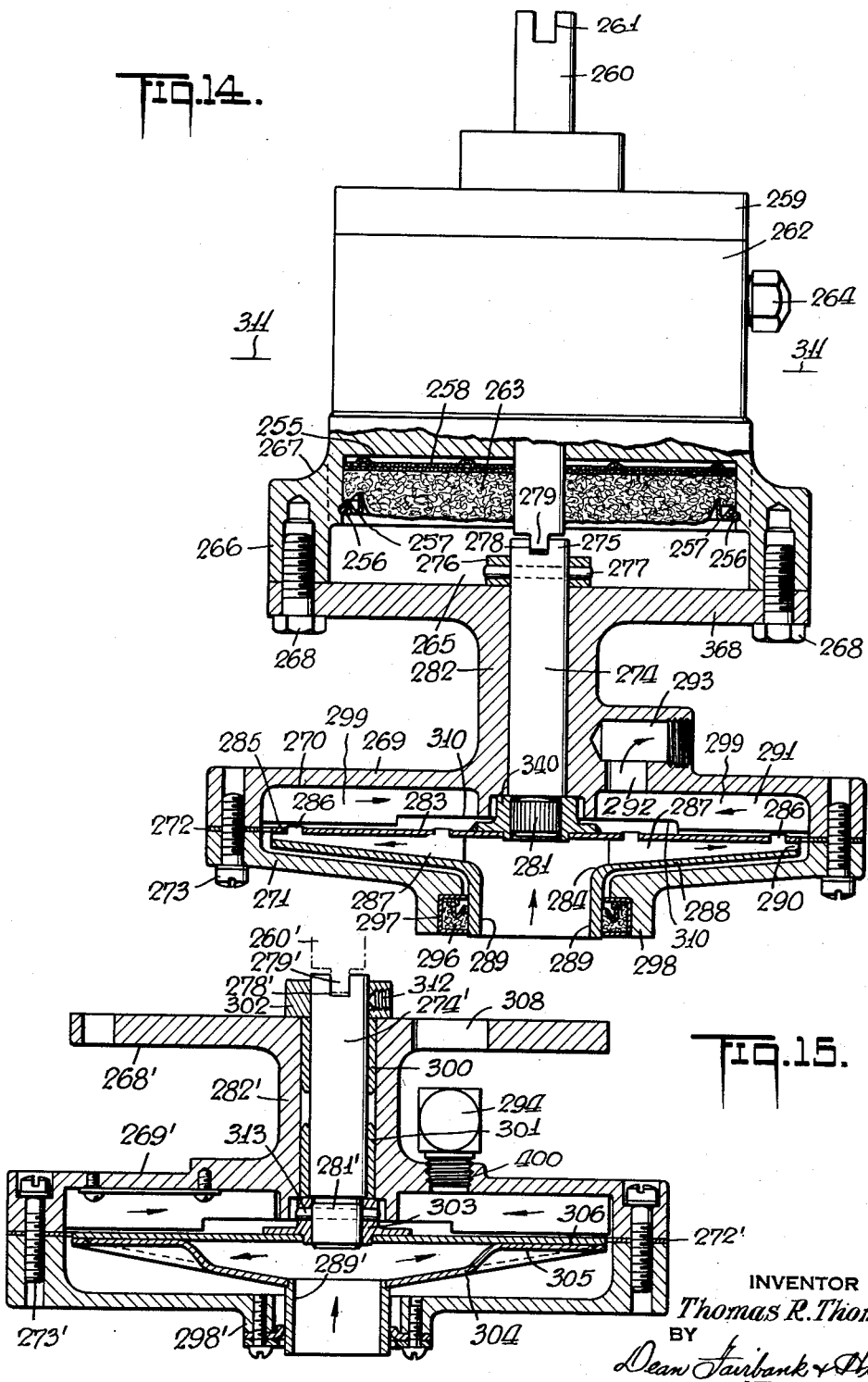

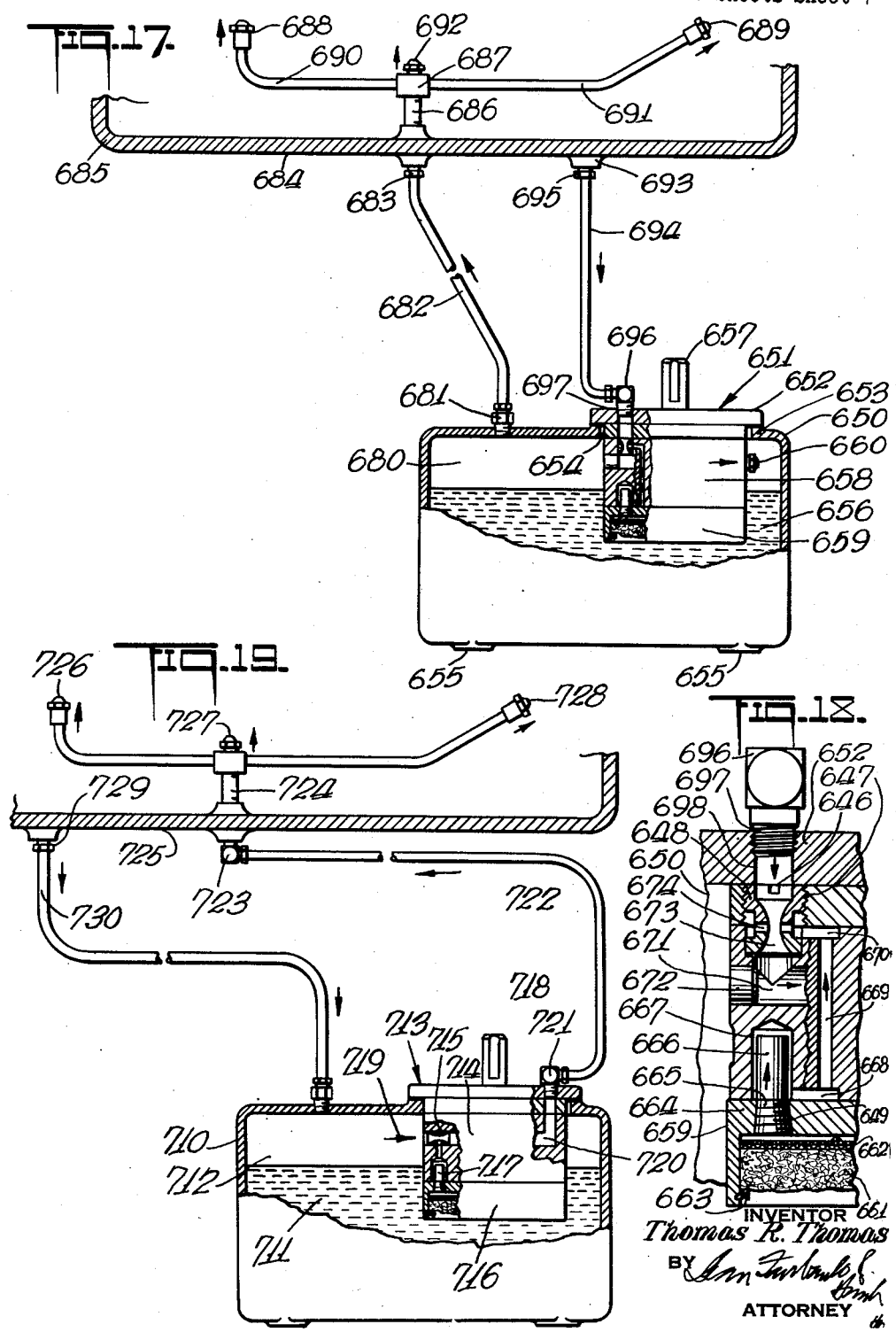

Patented Oct. 12, 1954

2,691,428

UNITED STATES PATENT OFFICE 2,691,428

LUBRICATION

Thomas R. Thomas, New York, N. Y., assignor to Auto Research Corporation, Dover, Del., a corporation of Delaware Application January 11, 1949, Serial No. 70,363

6 Claims. (Cl. 184—6)

1

The present invention relates to a lubricating installation and partially relates to a fog lubrication system.

In many lubricating installations, it is customary to feed the lubricant in predetermined proportions through conduits to a bearing or bearings which are to be lubricated.

It has now been found that for certain types of machinery where the bearings are encased and where there may be a desired circulation of gaseous fluids within the casing that a lubricant may be applied to bearings in the form of a fog or dispersion of air-borne or gas-borne lubricant particles of desired spacing and size at a desired circulation rate.

It is among the objects of the present invention to provide improved lubricating installation of a character described for creating a dispersion or flow of suspended lubricant particles which will result in adequate and effective lubrication of bearings within the casing or enclosure whch may be advantageously applied to machine tools as well as other machine lubrication.

Still other objects and advantages will appear in a more detailed description set forth below, it being understood that this more detailed description is given by way of illustration and explanation only and not by way of limitation, since various changes may be made by those skilled in the art without departing from the scope and spirit of the present invention.

In accomplishing the above objects, it has been found most satisfactory according to one embodiment of the present invention to provide an enclosure which may form part of the machine, with which is associated an air pump or an air injection system.

This air pump is desirably so associated with lubricant feeding and noozle means as to cause a fog discharge which will disperse itself and circulate in the desired manner in the casing to lubricate the bearings therein.

In the drawings, which illustrate but several of the possible embodiments of the present invention, these drawings being by way of illustration and not by way of limitation:

Fig. 1 is a side elevational view partly in section illustrating one schematic layout for lubricating installation according to the present invention as applied to a lathe headstock, illustrating a reservoir and circulating pump installed outside of a machine housing;

Fig. 1a is a detail fragmentary vertical sectional view of the fog nozzle of Fig. 1 upon an enlarged scale as compared to Fig. 1;

2

Fig. 2 is an elevational view partly in section of another embodiment as applied to a lathe, showing a self contained system wherein the pump is built into the machine housing and there is no external piping;

Fig. 3 is a vertical sectional view of another embodiment as applied to a lathe, with the system being self-contained and the pump being built into the machine housing and without external piping;

Figs. 4 and 5 are transverse sectional views, upon enlarged scales as compared to Figs. 1 and 3, of atomizing or fog producing nozzles, which may be utilized in embodiments of Figs. 1 to 3;

Figs. 4a and 5a show rear views of atomizing nozzles of Figs. 4 to 5 upon the lines of 4a—4a and 5a—5a of Fig. 5 respectively;

Figs. 6 and 7 show an alternative pump construction upon an enlarged scale as compared to Figs. 1 to 3, Fig. 6 being a top plan view partly in section and Fig. 7 being a transverse sectional view upon the line 7—7 of Fig. 6;

Fig. 8 is a transverse sectional view similar to Fig. 7 of an alternative construction;

Fig. 9 is a fragmentary vertical sectional view of an alternative construction to that shown in Figs. 6 to 8;

Fig. 10 is a vertical side elevational view, partly in section, of still another embodiment showing part of the machine housing containing the bearings to be lubricated;

Fig. 11 is a top plan view, partly in section, of still another embodiment;

Fig. 12 is an end elevational view from the line 12—12 of Fig. 11;

Fig. 13 is a transverse sectional view taken upon the line 13—13 of Fig. 12;

Fig. 14 is a side elevational view, partly in section, of an alternative construction having a centrifugal lubricant pump;

Fig. 15 is a side sectional view similar to Fig. 14 of another embodiment;

Fig. 16 is a side elevational view upon a relatively small scale of an alternative form of lubricant supply unit including a gear pump and a lubricant fog producing unit mounted on a cover in the same reservoir;

Fig. 17 is a schematic side elevational view, partly in section, better to show the reservoir and Venturi structure of an alternative embodiment;

Fig. 18 is a fragmentary side sectional view constituting an enlargement of the Venturi structure of Fig. 17 to show the detailed construction thereof; and Fig. 19 is a schematic side elevational view showing still another alternative embodiment of fog lubricator and machine housing.

Referring to the embodiment of Fig. 1, there is shown a balanced fog lubrication installation, including a lubricant reservoir A, a pump B and a fog producing unit C mounted upon the outside of the machine housing D.

The reservoir or oil supply A takes the form of a tank or container 10 having the body of oil 11 which extends up to the level 12. The container 10 is provided with an enclosure, cover or lid 13 and with an intervening gasket 14. The cover 13 carries the casing 15 of the oil pump B. The pump B has an inlet at 16 and an outlet at 17 which discharges through an opening 18 in the cover 13. The pump B has a drive shaft 19 which may be suitably driven from a part of the machine being lubricated or which may be independently driven.

The cover 13 also carries a depending tube 20 secured to the nipple 24 on the cover 13 by the compression coupling connection 21. The internal tube 20 communicates with an external tube 22 which is connected by the nipple 24 and by the compression coupling 23. The outlet connection or fitting 25 on the cover 13 is connected to the tube 26 by the compression coupling connection 27.

The tubes 22 and 26 are attached by the compression coupling connections 28 and 29 to the lower section 30 of the fog producing or atomizing unit C.

The unit C is provided with a flange 31 which is connected in oil tight fashion by the gasket 32 to the base 33 of the machine housing D. The housing D may be the casing of a lathe headstock.

The upstanding portion 34 of the element C has an oil reception chamber 35 receiving oil from the tube 22. The oil reception chamber 35 communicates with the atomizer or fog producing nipple 36. This nipple 36 is encircled by an annular passage 37 which communicates with the chamber 38 and the bore 39 receiving air under pressure from the tube 26.

The upstanding portion 34 is also provided with an oil overflow passage 40 which receives the excess oil from the chamber 35 and discharges into the interior of the machine tool housing D.

Connected to the bottom 33 of the machine housing D is the right angle nipple 41. The tube 42 is connected to the right angle nipple 41 by the compression coupling connection 43. The tube 42 serves as an oil and air return to the pump B.

In operation, the machinery enclosed within the housing D is continuously supplied with a fog of lubricant from the atomizer element C. The air pressure created above the liquid 12 in the reservoir A by the pump B will force air under pressure through the tube 26 to the element C with lubricant being drawn through the tube 22 to the unit C and being dispersed in a fog through said unit C.

Excess of oil will be withdrawn by the pump B through the tube 42 together with air. The pump B will normally be so connected with the mechanism within the housing D so as to operate continuously as the mechanism operates.

In the embodiment of Fig. 2 the machine housing D', receiving the lathe spindle E', has a lower portion A' forming a lubricant reservoir. The reservoir A' carries the combined motor and air pump unit B' as well as the atomizer unit C'.

Immersed in the body of oil 11' is the filter unit 50, which is carried by the attachment 52 on the depending tube 20'. The depending tube 20' enters the body 34'. The tube 20' communicates with the oil inlet chamber 35'. The chamber 35' communicates with the atomizing nipple 36'. The air is fed through the passage 38' to the annular passage 37'. There it picks up the oil in the form of fog and passes outwardly through the opening 53 in the nipple 54 which encircles atomizing nipple 36'. The air is taken in through the inlet 55 in the body 34'.

In Fig. 2 parts which function the same as parts in Fig. 1 are designated by the same letters and numerals provided with a prime.

In Fig. 3 is shown another embodiment in which parts having the same function as in Figs. 1 and 2 are indicated by the same letters and numerals provided with a superior 2.

In Fig. 3 the reservoir $A^2$ forms part of the machine housing $D^2$ receiving the lathe spindle $E^2$. The air pump $B^2$ as well as the atomizing unit $C^2$ are both within the machine housing $D^2$. The lubricant $11^2$ receives the strainer $50^2$ attached by a ring $52^2$ to the depending tube $20^2$. The depending tube $20^2$ is threaded at $21^2$ to the body $34^2$ of the atomizing unit $C^2$. The tube $20^2$ has a spray element $36^2$ passing through the air chamber $38^2$ and through an opening $37^2$. The opening $37^2$ forms an annular passageway around the spray nozzle $36^2$. The tube $26^2$ is connected to the air outlet $17^2$ of the pump body $15^2$ which has the air intake $55^2$.

It will be noted in Figs. 2 and 3 that there is no external piping and that the fog producing installation is self-contained with the pump being built into the machine housing.

In Figs. 4 and 5 are shown two atomizer constructions $C^6$ and $C^7$ adapted for use in the device of Fig. 1.

As shown in Fig. 4, the body 60 is threaded as indicated at 61 to be received in the machine housing. The body 60 has a flange 62 which may press an oil tight gasket 59 against the side of the housing.

The flange 62, which is of hexagonal shape, receives the tapped opening 63 for connection to the air outlet of an air pump and the tapped opening 64 for a conduit connection to a body of oil in a reservoir which may be maintained under pressure as already described in Figs. 1 to 3.

The chamber 65 inside of the tapped opening 63 communicates with a bore 66. The bore 66 in turn communicates with a recess 67 in the nipple portion of the body 60.

The chamber 68 inside of the tapped opening 64 communicates with the bore 69 which is recessed at 70 to receive the base 71 of the atomizing nozzle 72. The atomizing nozzle 72 is provided with a small diameter nipple portion 73 which projects forwardly into the chamber 67. The opening 74 in the insert 75 receives the nipple 73. The insert 75 is press-fitted into and closes the chamber 67. The plate 75 has a conically shaped recess 76 extending toward the nipple 73.

The atomizing nozzle as shown in Fig. 4 may be utilized in lieu of the atomizing nipple shown at C in Fig. 1.

In Fig. 5 the spray nipple $C^7$ has a circular flange portion 80, carries a gasket 79 and has a threaded nipple 81 with a smaller diameter nipple 82. On the nipple 82 is fitted the skirt 83 of the sheet metal cup 84. The cup 84 has a bulged portion 85 with a center opening 86. The body of the nipple C⁷ is provided with the tapped openings 87 and 88 respectively for receiving an air connection from the air pump B and for receiving an oil connection from the reservoir A previously described in connection with Figs. 1 to 3.

The recess 89 inside of the tapped opening 87 communicates with the bore 90 which in turn communicates with the recess 91 between the cup 84 and the top or end of the nipple 82.

Inside of the tapped opening 88 is the recess 92 which communicates with the bore 93. The bore 93 communicates with the transverse bore 94 which in turn communicates with the small diameter atomizing bore 95 which extends into the nipple 96 on the end of the nipple 82. The nipple 96 projects into the opening 86. As a result, the air rushing from the bore 90 into the chamber 91 will aspirate oil through the bore 95, through the opening 86 into the interior of the machine housing.

In the embodiment of Figs. 6 and 7 is shown a base plate 101 having the bolt openings 102 enabling mounting of the atomizing or fog discharge unit upon a suitable machine housing or mechanism. The pump body 117 is provided with an upper plate 103 which has a simple nipple 104 projecting through the opening 105 in the plate 101. The nipple 104 has a central opening 106 for a shaft 107 which has an oil tight bearing 108 in a recess 109 in the top of the nipple 104. The upper end of the shaft 107 has a driving slot 175. The plate 103 is held in position by two bolts 110, one of which is shown. The bolt 110 passes through the opening 111 in the member 101 and washer 100 and is threaded at 112 to the flange 103.

Upon the shaft 107 is the central element 113 having the slots 115 carrying the vanes 114. The vanes 114 are normally pressed outwardly by centrifugal force against the interior wall 116 of the pump body 117. The pump body 117 is provided with a recess 118 receiving the threaded nipple 119. The nipple 119 has a central axial Venturi opening 120.

The element 119 has a fillister slot 121 enabling it to be screwed into position in the recess 118.

Communicating with the reduced diameter portion of the Venturi opening 120 are the radial bores 122 which open into the annular groove 123. The inside end 124 of the element 119 is of reduced diameter and it compresses the gasket 125 against the base of the recess 118. The recess 118 is provided with an opening 126 into the interior 116 of the pump body 117. The other side of the pump body is provided with a transverse bore 127 having a tapped outer portion 128. The tapped outer portion 128 receives the fog discharge nipple 129.

Attached to the base of the pump body 117 is the plate 130 recessed at 131 to receive the filter 132 peripherally held in position by the snap ring 134 and the retainer ring 133. At the inside of the recess 131 are the double screens 135 which back up the filter pad 132.

The plate 130 has a central opening 136 receiving the reduced diameter portion 137 of the shaft 107. The plate 130 is also provided with a tapped opening 138 which receives the threaded portion 139 of the fitting 140 which has a central oil restriction orifice 141. The upper portion of the fitting 140 is of reduced diameter so as to fit into a recess 143 in the pump body which recess terminates in a short bore 144 communicating with the peripheral groove 123 of the element 119.

In the embodiment of Figs. 6 and 7, the vane pump 114—117 draws lubricant through the filter 132 and the orifice 141 by aspiration of the air which is drawn through the venturi hole 120 producing a fog in the pump chamber 116. This fog will normally pass into the interior of the machine housing and thoroughly lubricate the bearings therein. The oil level as indicated at 145 will normally be above the filter plate 130 but below the nozzle 129.

In Figs. 8 and 9 are shown alternative constructions similar to those shown in Figs. 6 and 7 with similarly functioning parts being indicated by the same numerals provided respectively with the superior 3 and a superior 4.

In Fig. 8 the groove 141³ serves as a restriction groove for the oil and the oil is admitted thereto through the passageway 138³. The oil then passes into the chamber 143³, the bore 144³ into the venturi hole 120³. There it is picked up and drawn into the pump chamber 116³. The pump chamber 116³ will cause a fog to pass into the chamber 127³ and out through the nozzle 129³. The nozzle 129³ is press-fitted into the bore 127³.

In Fig. 9, lubricant is drawn through the filter 132⁴ through the restriction 141⁴ which is housed in a groove 147 in the plate 130⁴ and has an outlet compression coupling connection 146. The outlet communicates with the bore 144⁴ which in turn communicates with the venturi hole 120⁴.

In Fig. 9 the lubricant is drawn through the reduced diameter tube 141⁴ and the bore 144⁴ by the Venturi tube effect set up in the venturi hole 120⁴.

In Fig. 10 is shown an embodiment utilizing the pump of Fig. 7 in which there is a vertical drive installation. The mounting plate 101⁵ has been modified, however, by being provided with the portion 161 forming the base of a cup 162 with the outstanding flanges 163. The flanges 163 are connected by the bolts 164 to base plate 165 of the motor 166 and the flanges 167 and 168 forming part of the machine housing 169. The machine housing 169 has an outstanding cup member 170 below the flanges 167 and 168 serving as a reservoir. This reservoir 170 is provided with a sight glass 171.

The base plate 165 has a depending portion 172 fitting into the recess 173 of the cup 162. By this connection, the depending shaft 174 of the motor 166 will be aligned with the upwardly projecting end of the pump shaft 107. The shafts 174 and 107 are connected by the slot 175 and the spline 176. The normal oil level as indicated at 177 should be at the middle of the window 171 with the level varying between the top and bottom of the window 171 as indicated by the lines 178 and 179.

In Figs. 11 to 13, the horizontal shaft 200 has a driving slot 201. The shaft 200 passes through the opening 202 in the cover plate 203, which has a recess 204 receiving the packing material 205. The cover plate 203 is attached to the pump body 206 by the screws 207. The pump body 206 has a pump recess 208 receiving the rotary element 209 having the vanes 210.

The rotating vanes 210 draw in air through the replaceable Venturi tube element 212 screwed into the tapped opening 213 by the fillister slot 214. The Venturi tube element 212 has a central passageway 215 communicating with the annular recess 216 by the radial bores 217. The gasket 218 seals the end of the Venturi tube element 212 where it communicates with the passageway 219 leading into the pump recess 208.

The opposite side of the pump body 206 carries the fog discharge nozzle 220 by the elbow 221.

Attached to the pump body 206 is the plate 222 by the screws 223. The plate 222 has ribs 224, 225 and 226, the last mentioned carrying the lubricant bore 227 and extending down to the mushroom opening 233 into the cup member 228. The cup member 228 has a recess 229 receiving the filter 230, the backing screens 231, the snap ring 234 and the retaining ring 232.

The lubricant from the filter 230 passes through the bore 227 to the recess 235 closed by the plate 236. The recess 235 receives the bearing end 237 of the shaft 200. From the recess 235 the lubricant flows through the bore 238 closed by the plug 239 to the transverse bore 240.

The oil restriction intake orifice member 241 is provided with a restriction passage 199 and has an enlarged inlet end 242 fitting into the recess 243 in the plate 222 and an outlet end 244 projecting into the recess 245 in the pump body 206. The recess 245 communicates with the bores 217 of the Venturi tube element 212.

In operation the pump vanes 210 will draw air past the bores 217 of the element 212 creating a lubricant fog which is forced out through the nozzle 220.

In the embodiment of Fig. 14, the shaft 260 has a drive slot 261. The air pump body 262 with the cover plate 259 is of the same construction as in Figs. 6 and 7 with an inlet filter 263, backing screens 258, a retainer ring 257 and a snap ring 256 all in the recess 255. The air pump body 262 has an outlet fog nozzle 264. The lubricant passes into the chamber 265 between the legs 266 of the spider 267. The bolts 268 connect the spider 267 to the mounting plate 368 of the pump casing 269. The pump casing has a central recess 270 closed by the bottom plate 271. The bottom plate 271 is connected by the fibre or leather gasket 272 and bolts 273 to the casing 269.

The casing 269 carries the bearing 282 for the shaft 274 which projects at 275 into the chamber 265 where it is provided with a collar 276 and a pin 277. The shaft 274 has a slot 278 which receives the spline 279 of the shaft 260 which projects downwardly through the filter 263.

The lower end 281 of the shaft 274 is serrated and fits into the hub member 340 soldered or welded to the top plate 283 of the rotary centrifugal pump base member 284. The plate 283 has openings 285 receiving the peened over extensions 286 of the vertical plates 287 extending between the plate 283 and the conical base plate portion 288 of the pump base member 284.

The lubricant enters through the central bottom tubular member 289, passes between the plates 287 outwardly through the recesses 290 inwardly through the upper chamber 291, the bores 292 and 293 and through a fitting 294 (as shown in Fig. 15), to any part or parts requiring lubricant, as for example the gears in the headstock of a lathe.

The downward tubular portion 289 of the base member 284 is sealed by the annular sealing member 296 fitted into the recess 297 in the downwardly projecting portion 298 of the bottom plate 271. The baffle fins 299 recessed at 310 and placed in the chamber 291 slow down the rush of lubricant.

The unit of Fig. 14 is preferably immersed in lubricant up to the level 311 leaving the nozzle 264 and air intake (not shown) above the lubricant level.

In the lubricant fog producing and pump combination of Fig. 15, similarly functioning parts as in Fig. 14 being indicated by the same numerals primed, there are two bearing sleeves 300 and 301 pressed into casing 269'. The thrust collars 302 and 303 serve to keep shaft 274' in place. The collars are held in place by the set screw 312 and pin 313, respectively. Instead of plates 287, the bottom plate 304 is bent up and welded at spaced portions 305 to the top plate 306. The top plate 268' has an opening 308 to permit drilling and tapping of opening 400.

In the combined units of Figs. 14 and 15, the centrifugal pump will lubricate, by spray or direct circulation, the low speed bearings and gears of the headstock in various machines such as lathes of the Potter & Johnson, Monarch and Warner & Swasey types. The centrifugal pump will supply lubricant to these bearings at about 20 lbs. per square inch. The fog, on the other hand, will be distributed to various points in the headstock and lubricate the high speed bearings, particularly the anti-friction bearings of the high speed spindles, maintaining a thin film of lubricant upon them. This will be done without creation of a positive pressure and without excessive leakage of air through the bearings.

In the preferred embodiments above, there is used a vane type air pump with a return line from the bearing housing to the pump, creating a balanced condition to eliminate positive pressure and leakage (see particularly Fig. 1).

To avoid connecting exterior lines, the entire pump and fog creating and ejection unit may be placed in a machine housing (see Figs. 2 to 14).

In Fig. 16 is shown a combination of an oil pump 500 and a fog pump 501 mounted in the cover 502 in the reservoir casing 503. Each pump has an outlet pipe 504 and 505 and oil inlet through the filter units 506 and 507.

Pump 500 may have a constant feed gear pump unit 508. Pump 501 has an inlet 509.

The drive is from the left by the belt 510 which drives the shaft 511 through pulley 512. Pulley 513, through belt 514, drives pulley 515 on shaft 516. Thus in one unit is provided both a lubricant and fog pump with a common drive.

Referring to Fig. 17, the reservoir 650 receives the fog lubricator unit 651. The cover 652 of the fog lubricator unit 651 is positioned upon the periphery 653 of an opening 654 in the reservoir 650.

The reservoir is provided with the mounting elements 655 and receives the lubricant 656.

The fog lubricator unit 651 has an externally driven shaft 657 which drives the blower or pump unit 658. To the bottom of the pump unit 658 is attached a filter unit 659.

The fog produced by the unit 658 will be ejected through the fog outlet or nozzle 660 in the side of the body 658.

As is best shown in Fig. 18, the filter unit 659 carries the felt filter 661 backed by the metallic screens 662. The filter 661 is held in position by the ring 663. The upper structure 664 of the filter unit 659 has a tapped opening 649 which receives the threaded end 665 of the oil restriction orifice unit 666. The upper outlet end of the unit 666 projects into the socket 667.

The lubricant passes from the socket 667 through the passage 668 into the bore 669 and into the passage 670.

The pump unit 658 will exert a substantial suction upon the chamber 671. The chamber 671 is closed by plug 672. The venturi unit 648 is screwed into the tapped opening 647 in the pump body 658 by the fillister slot 646. This suction will draw upon the venturi hole or passage 673 in the unit 648 having the side openings 674. These side openings 674 will exert a suction upon the chamber 671, drawing lubricant up past the filter 661 and through the passages 668, 669 and 670.

The fog or lubricant ejected through the fog outlet 660 will pass into the air space 680 above the lubricant body 666 (see Fig. 17). It will then flow through the coupling connection 681 and through the pipe 682 to the machine housing 685. The pipe or tubing 682 will be connected by the coupling fitting 683 to the wall 684 of the machine housing 685.

The fog then will pass through the short tubing section 686 into the head 687 where it is distributed to the spray nozzles 688 and 689 by the tubing 690 and 691 and directly to the spray nozzle 692.

From the bottom of the reservoir at 693 the return flow tubing 694 is connected by the compression coupling fitting 695. This fitting is connected to the adaptor 696, which has a threaded projection 697 (see Fig. 18) to screw into a tapped opening 698 in the cover 692.

The unit as shown in Figs. 17 and 18 is designed to draw air and lubricant from the machine housing 685 by the tube 694. It will create a fog in the upper air chamber 680 of the reservoir 650.

The larger oil particles will be thrown against the walls of the reservoir 650 and the dry oil fog will then pass through the tubing 682 into the machine housing 685. The dry fog may then be distributed by the nozzles 688, 689 and 692.

This unit will produce a much drier fog than if the fog would be discharged directly from the fog unit 651 into the tubing 682.

In the arrangement shown in Fig. 19, the reservoir 710 has a lubricant body 711 and an upper air body 712. The fog lubricant unit 713 has a pump section 714 with a venturi unit 715, a filter arrangement 716 and a restriction 717. The pump is driven by the shaft 718.

The venturi unit 715 will draw air directly out of the space 712 as indicated by the arrow 719. This fog will then be forced into the passage 720 to the coupling connection 721 and the tubing 722. From the tubing 722, the lubricant fog will pass through the adaptor 723, into the tube 724, and to the nozzles 726, 727 and 728 inside of the housing 725.

From the bottom of the reservoir, as indicated at 729, the lubricant will flow into the tubing 730 into the reservoir 710.

In the arrangement shown in Fig. 19, the venturi unit 715 is part of the fog pump 714 and the passages 720 and 721 serve to discharge the fog directly to the spray heads or distributors 726, 727 and 728. The excess lubricant and fog will flow back into the reservoir 710 through the pipe 730.

Generally the fog pump of the present invention may well be started before the machine by an auxiliary motor so that the bearings will be immersed in the fog before the machine is started. This may be accomplished automatically by a switch which will start operation of the fog pump at a predetermined interval before the machine is started.

At the same time the fog pump should be alternatively stopped just before or at the same time as the machine being lubricated to avoid sucking in dirt.

The fog lubricator of the present invention may be associated with a fully circulating, partly circulating or non-circulating system with part or all of the fog being condensed and returned to the reservoir.

Since certain changes may be made in the above lubricating installation and different embodiments of the invention could be made without departing from the scope thereof, it is intended that all matter contained in the above description or shown in the accompanying drawings shall be interpreted as illustrative and not in a limiting sense.

What is claimed is:

1. In a fog lubrication installation a machine casing containing mechanism to be lubricated, a separate lubricant casing serving as a lubricant reservoir having an upper air space and a lower lubricant body, a fog producing member opening into said machine casing mounted at said machine casing and having an outlet nozzle opening into and spraying a lubricant fog into said casing and having inlets to receive air and lubricant under pressure, and lubricant and air conduits extending between said inlets and said lubricant reservoir, the lubricant conduit extending from the lubricant body to the nozzle and the air conduit extending from the upper air space to the fog-producing member, an air and lubricant pump to force air pressure into said reservoir casing past said nozzle and a return conduit from said machine casing to said lubricant casing extending to and through said air and lubricant pump and serving to feed air and lubricant from the machine casing.

2. The installation of claim 1 in which said air and lubricant pump is mounted upon said lubricant casing, said air and lubricant pump serving to draw air and lubricant through said return conduit and discharge it into said air space.

3. A lathe headstock lubrication installation of the type having a housing enclosing the headstock bearings and a fog-producing unit in the wall of said housing, said unit including a nozzle with a central small opening, an encircling structure forming an annular passage around said nozzle, said structure having an air inlet chamber to supply air to said annular passage, and an oil inlet chamber to supply oil to said nozzle, a lubricant and compressed air reservoir and conduits from the upper and lower part of said reservoir to said chambers and an air and lubricant pump to pump air and oil into said reservoir from the housing, said pump having a supply conduit extending from said housing to the pump and said pump also having an outlet opening into said reservoir.

4. The installation of claim 3 in which a passage to said oil inlet chamber is also provided from the interior of the housing so that said oil inlet chamber may receive lubricant from the interior of said housing.

5. The installation of claim 3, said pump being mounted upon the top of said reservoir and said supply conduit for said pump being connected to the bottom of said housing and drawing air and lubricant from the bottom of said housing and supplying it to said reservoir.

6. In a fog lubrication installation for a mechanism having a closed housing with a plurality of bearings to be lubricated by a lubricant fog, comprising a reservoir with a chamber forming a combined lubricant and compressed air receptacle, a cover for said receptacle, an air and lubricant pump mounted on said cover and discharging through said cover into the receptacle, three conduits extending between said receptacle and said housing, an aspirator spray nozzle unit mounted on the wall of said housing and discharging into the housing, one conduit connecting the lower part of the receptacle below the level of lubricant in the receptacle to the nozzle unit, a second conduit connecting the upper part of the receptacle where there is contained the compressed air in the receptacle to the nozzle unit and a third conduit connecting the housing to the air and lubricant pump to feed air and lubricant to and through the pump from the housing to the receptacle.

References Cited in the file of this patent

UNITED STATES PATENTS

| Number | Name | Date |
|---|---|---|
| 524,318 | Gill | Aug. 14, 1894 |
| 1,342,904 | Greenleaf | June 8, 1920 |
| 1,354,663 | Kirkman | Oct. 5, 1920 |
| 1,824,540 | Gronkwist | Sept. 22, 1931 |
| 1,967,251 | McFerren | July 24, 1934 |
| 2,042,575 | Worth | June 2, 1936 |
| 2,531,411 | Davenport | Nov. 28, 1950 |

FOREIGN PATENTS

| Number | Country | Date |
|---|---|---|
| 165,255 | Great Britain | June 30, 1921 |
| 587,771 | Great Britain | May 6, 1947 |